United States Patent
Shin et al.

(10) Patent No.: US 11,502,327 B2
(45) Date of Patent: Nov. 15, 2022

(54) SECONDARY BATTERY (71) Applicant: Samsung SDI Co., Ltd., Yongin-si (KR)

(72) Inventors: Man Soo Shin, Yongin-si (KR); Young Jin Jang, Yongin-si (KR); Jun Hee Lee, Yongin-si (KR); Jong Hoon Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 210 days.

(21) Appl. No.: 16/309,003

(22) PCT Filed: Mar. 28, 2017

(86) PCT No.: PCT/KR2017/003343
§ 371 (c)(1),
(2) Date: Dec. 11, 2018

(87) PCT Pub. No.: WO2018/012709
PCT Pub. Date: Jan. 18, 2018

(65) Prior Publication Data
US 2019/0260069 A1  Aug. 22, 2019

(30) Foreign Application Priority Data
Jul. 12, 2016 (KR) .................. 10-2016-0088094

(51) Int. Cl.
*H01M 10/0525* (2010.01)
*H01M 10/04* (2006.01)
(Continued)

(52) U.S. Cl.
CPC ..... *H01M 10/0525* (2013.01); *H01M 10/045* (2013.01); *H01M 50/10* (2021.01);
(Continued)

(58) Field of Classification Search
CPC ...... H01M 2/12; H01M 2/1241; H01M 50/30; H01M 50/3425
See application file for complete search history.

(56) References Cited

U.S. PATENT DOCUMENTS 4,987,520 A * 1/1991 Rots .................. H01G 9/12
361/521
6,159,631 A * 12/2000 Thompson ........ H01M 50/3425
429/82
(Continued)

FOREIGN PATENT DOCUMENTS

CN        1371140 A     9/2002
CN     201311941 Y      9/2009
(Continued)

OTHER PUBLICATIONS

EPO Extended Search Report dated Nov. 28, 2019, for corresponding European Patent Application No. 17827783.6 (9 pages).
(Continued)

*Primary Examiner* — Sadie White
(74) *Attorney, Agent, or Firm* — Lewis Roca Rothgerber Christie LLP (57) ABSTRACT

Disclosed in the present invention is a secondary battery having a safety vent integrally formed with a side wall part of a case thereof whereby the secondary battery is improved in safety and has the effect of reducing manufacturing cost and simplifying process. As an example, disclosed is a secondary battery comprising: an electrode assembly; a case for receiving the electrode assembly; and a cap plate for covering an opened opening of the case, wherein the case includes two pairs of side wall parts, the side wall parts in each pair facing each other, and a bottom part perpendicular to the side wall parts, and a safety vent is integrally formed with an edge part of one region selected from the side wall parts and the bottom part.

5 Claims, 8 Drawing Sheets

(51) Int. Cl.
*H01M 50/10* (2021.01)
*H01M 50/30* (2021.01)

(52) U.S. Cl.
CPC .............. *H01M 50/30* (2021.01); *Y02E 60/10* (2013.01); *Y02T 10/70* (2013.01)

(56) References Cited

U.S. PATENT DOCUMENTS

| | | | |
|---|---|---|---|
| 6,964,690 B2 | 11/2005 | Goda et al. | |
| 7,754,373 B2 | 7/2010 | Aizawa et al. | |
| 8,481,201 B2* | 7/2013 | Kim ................... | H01M 50/557 429/176 |
| 8,974,936 B2 | 3/2015 | Lee et al. | |
| 2002/0028374 A1* | 3/2002 | Yoshida .............. | H01M 2/1241 429/94 |
| 2003/0077505 A1 | 4/2003 | Goda et al. | |
| 2005/0106451 A1 | 5/2005 | Kim et al. | |
| 2005/0181272 A1* | 8/2005 | Kim ................... | H01M 2/0202 429/56 |
| 2007/0099070 A1* | 5/2007 | Aizawa ............... | H01M 2/1241 429/56 |
| 2007/0145098 A1* | 6/2007 | Lee .................... | H01M 2/02 228/101 |
| 2009/0068550 A1* | 3/2009 | Uh .................... | H01M 50/3425 429/82 |
| 2009/0305114 A1* | 12/2009 | Yeo ................... | H01M 50/572 429/163 |
| 2010/0233520 A1* | 9/2010 | Suzuki .............. | H01M 50/3425 429/56 |
| 2011/0117424 A1* | 5/2011 | Kim ................... | H01M 50/543 429/176 |
| 2011/0123844 A1* | 5/2011 | Bhardwaj ............ | H01M 50/116 429/56 |
| 2011/0269013 A1* | 11/2011 | Yoon .................. | H01M 2/1241 429/176 |
| 2012/0177961 A1 | 7/2012 | Lee et al. | |
| 2015/0010809 A1* | 1/2015 | Seong ................ | H01M 50/103 429/163 |

FOREIGN PATENT DOCUMENTS

| | | |
|---|---|---|
| JP | 2001-266804 A | 9/2001 |
| JP | 2014-86162 A | 5/2014 |
| KR | 2000-0014824 A | 3/2000 |
| KR | 10-2001-0038812 A | 5/2001 |
| KR | 10-2006-0027270 A | 3/2006 |
| KR | 10-2006-0103029 A | 9/2006 |
| KR | 10-0670432 B1 | 1/2007 |
| KR | 10-2007-0027358 A | 3/2007 |
| KR | 10-2011-0033038 A | 3/2011 |
| KR | 10-1061148 B1 | 8/2011 |
| KR | 10-2013-0105591 A | 9/2013 |
| WO | WO 0161770 A1 | 8/2001 |

OTHER PUBLICATIONS

International Search Report for corresponding International Application No. PCT/KR2017/003343, dated Jul. 10, 2017, 3pp.
Chinese Office Action from corresponding Chinese Application No. 201780038430.4, Chinese Office Action dated Dec. 3, 2020 (13 pgs. with English Translation).

* cited by examiner

SECONDARY BATTERY

CROSS-REFERENCE TO RELATED APPLICATION(S)

This application is a National Phase Patent Application of International Patent Application Number PCT/KR2017/003343, filed on Mar. 28, 2017, which claims priority of Korean Patent Application No. 10-2016-0088094, filed Jul. 12, 2016. The entire contents of both of which are incorporated herein by reference.

TECHNICAL FIELD

The present invention relates to a secondary battery.

BACKGROUND ART

Unlike a primary battery that cannot be charged, a secondary battery may be recharged. A low-capacity secondary battery comprised of one single battery cell is used as the power source for various portable small-sized electronic devices, such as cellular phones, and camcorders. A high-capacity secondary battery in which several tens of battery cells are connected in a battery pack is widely used as the power source for motor drives, such as those in hybrid electric vehicles.

The secondary battery is manufactured in various shapes, and representative shapes include a cylindrical shape, a prismatic shape and a pouch shape. The secondary battery is configured such that an electrode assembly formed by positive and negative electrode plates with a separator as an insulator interposed therebetween, and an electrolyte, are housed in a case, and a cap plate is coupled to the case. Of course, positive and negative electrode terminals are connected to the electrode assembly and then exposed or protruded to the outside through the cap plate.

DESCRIPTION OF THE INVENTION

Technical Problems to be Solved

The present invention provides a secondary battery having a safety vent integrally formed with a side wall part of a case, whereby the secondary battery is improved in safety and has effects of reducing the manufacturing cost and simplifying the manufacturing process.

Technical Solutions

In accordance with an aspect of the present invention, there is provided a secondary battery comprising: an electrode assembly; a case for receiving the electrode assembly; and a cap plate for covering an opened opening of the case, wherein the case includes two pairs of side wall parts, the side wall parts in each pair facing each other, and a bottom part perpendicular to the side wall parts, and a safety vent is integrally formed with an edge part of one region selected from among the side wall parts and the bottom part.

Here, the safety vent may be formed by cutting a portion of the case a predetermined depth from the exterior surface of the case.

In addition, the safety vent may include a vent groove having a predetermined depth from the exterior surface of the case and a notch groove having a predetermined depth from the bottom surface of the vent groove.

In addition, a sum of the depth of the vent groove and the depth of the notch groove may be 70% to 90% of the overall thickness of a region where the safety vent is formed.

In addition, the safety vent may include a rounded leading edge and a linear trailing edge formed at its one and the other sides, respectively.

The trailing edge of the safety vent may be positioned on the same line with an edge part of the region where the safety vent is formed.

The edge part of the region where the safety vent is formed may be a place where each of the side wall parts and the bottom part meet.

The two pairs of side wall parts may include first and second long side wall parts spaced apart from each other and facing each other; and first and second short side wall parts spaced apart from each other and having smaller areas than the first and second long side wall parts.

The safety vent may be formed at one selected from the first short side wall part and the second short side wall part.

In addition, the safety vent may be formed at the bottom part of the case.

Advantageous Effects

As described above, in the secondary battery according to the present invention, since the safety vent is integrally formed with a side wall part of the case, the secondary battery may have improved safety and can demonstrate effects of reducing the manufacturing cost and simplifying the manufacturing process.

In addition, since the trailing edge of the safety vent is positioned at an edge part of an end of the side wall part, the processability and accuracy in manufacturing the secondary battery can be improved.

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

First, a configuration of a secondary battery according to an embodiment of the present invention will be described with reference to FIGS. 1 and 2.

Figure 1:
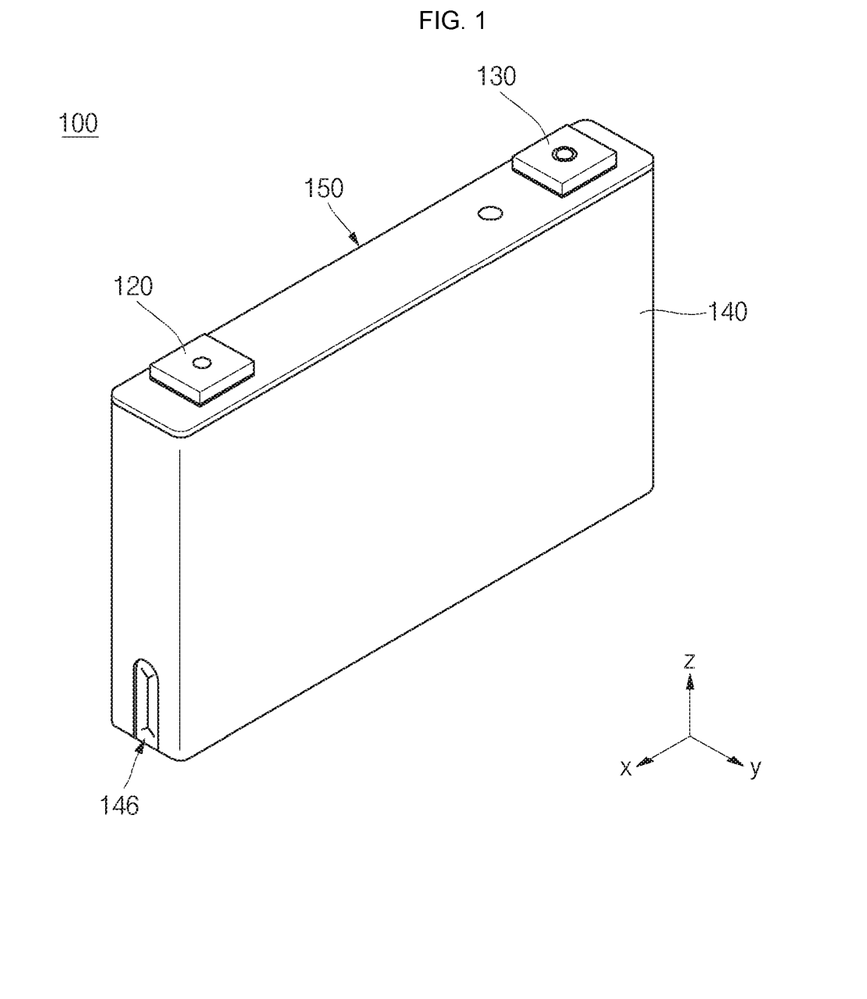
FIG. 1 is a perspective view of a secondary battery according to an embodiment of the present invention.

FIG. 1 is a perspective view of a secondary battery according to an embodiment of the present invention. FIG. 2 is a cross-sectional view of a secondary battery according to an embodiment of the present invention.

Figure 2:
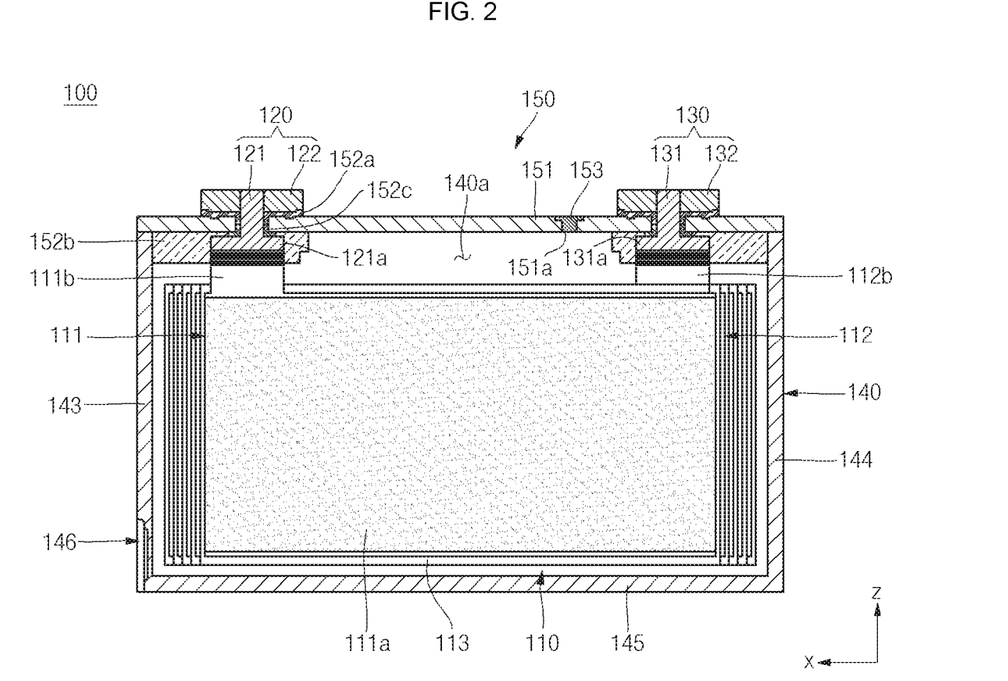
FIG. 2 is a cross-sectional view of a secondary battery according to an embodiment of the present invention.
Figure 3A:
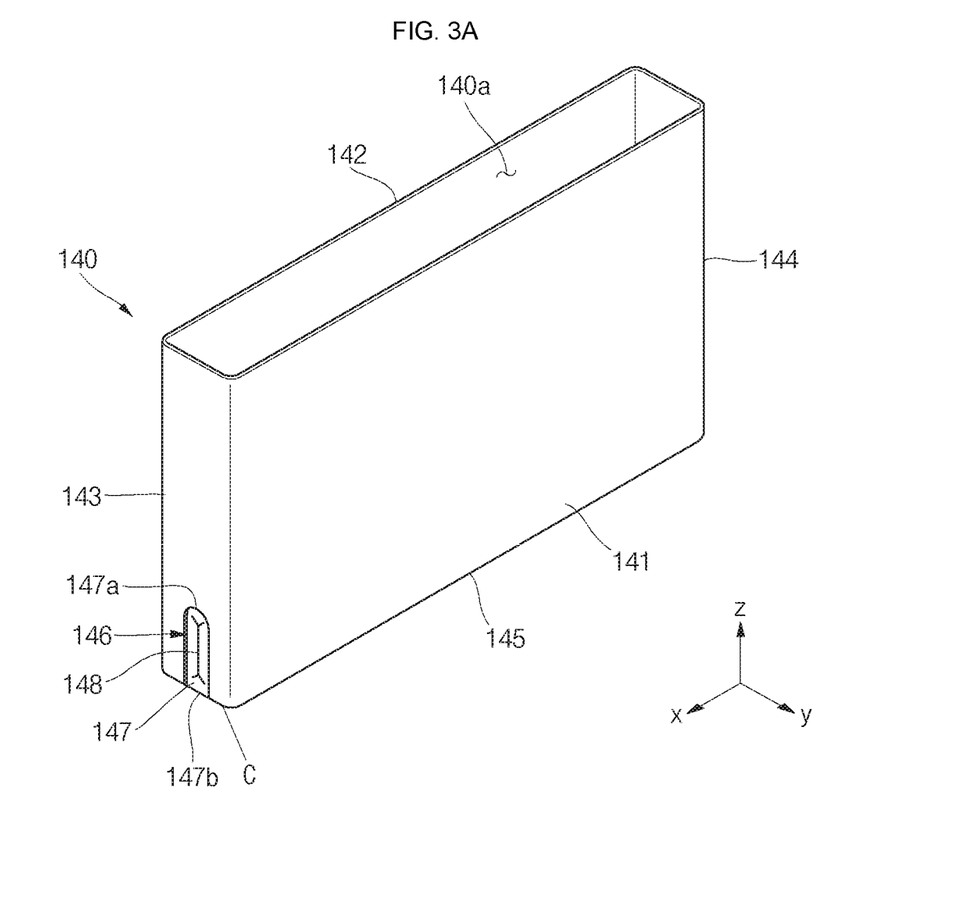
FIGS. 3A to 3D specifically illustrate a case of the secondary battery according to an embodiment of the present invention.
Figure 3B:
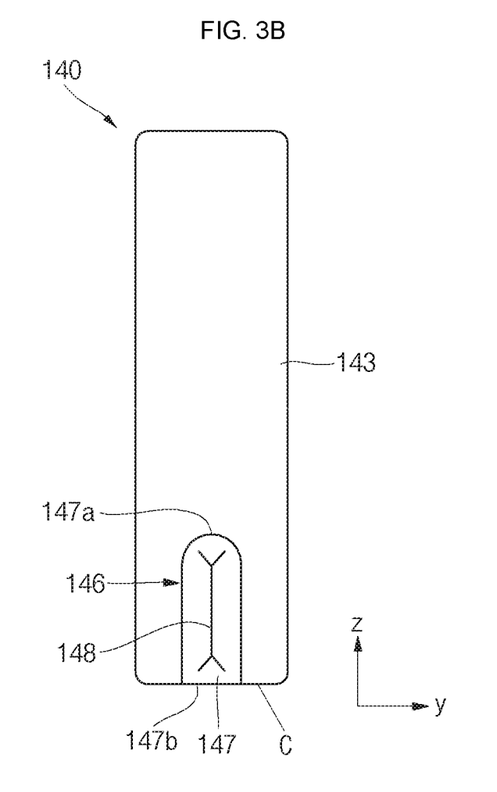
Figure 3C:
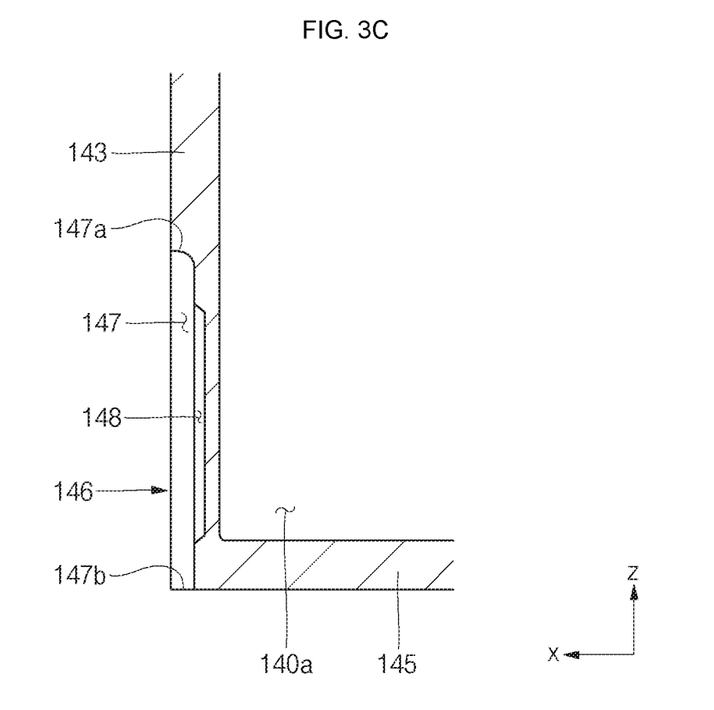
Figure 3D:
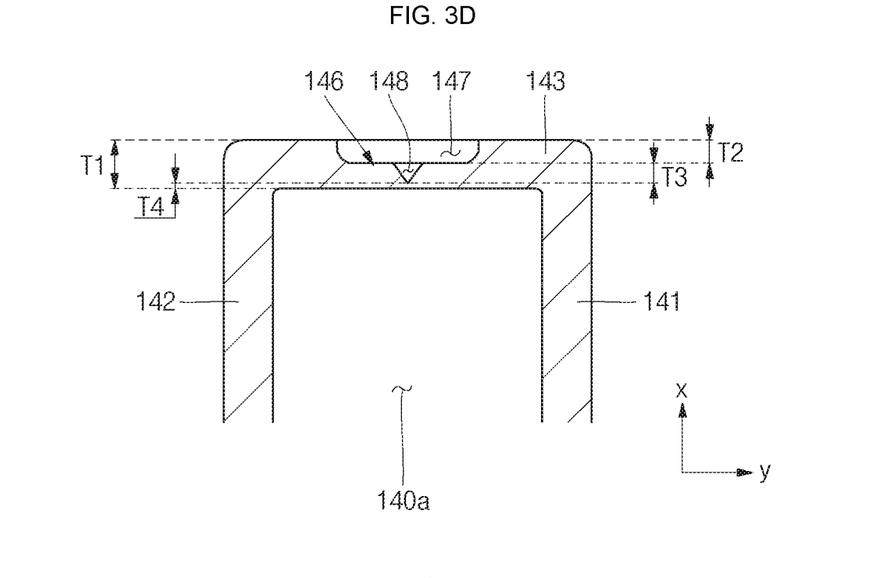

Referring to FIGS. 1 and 2, the secondary battery 100 according to an embodiment of the present invention includes an electrode assembly 110, a first terminal 120, a second terminal 130, a case 140 and a cap plate 150.

The electrode assembly 110 may be formed by winding or stacking a stack structure of a first electrode plate 111, a separator 113, and a second electrode plate 112, which are formed of thin plates or layers. The first electrode plate 111 may serve as a negative electrode and the second electrode plate 112 may serve as a positive electrode, or vice versa.

The first electrode plate 111 may be formed by coating a first electrode active material, such as a transition metal, on a first electrode collector plate formed of a metal foil made of aluminum or an aluminum alloy. The first electrode plate 111 may include a first electrode active material layer 111a where the first electrode active material is coated and a first electrode uncoated portion 111b where the first electrode active material is not coated. The first electrode uncoated portion 111b may function as a passage for current flowing between the first electrode plate 111 and an exterior of the first electrode plate 111. Meanwhile, the present invention does not limit the material of the first electrode plate 111 to those disclosed herein.

The second electrode plate 112 may be formed by coating a second electrode active material, such as graphite or carbon, on a second electrode collector plate formed of a metal foil made of copper, a copper alloy, nickel or a nickel alloy. The second electrode plate 112 may include a second electrode active material layer (not shown) where the second electrode active material is coated and a second electrode uncoated portion 112b where the second electrode active material is not coated. The second electrode uncoated portion 112b may function as a passage for current flowing between the second electrode plate 112 and an exterior of the second electrode plate 112. Meanwhile, the present invention does not limit the material of the second electrode plate 112 to those disclosed herein.

The first electrode plate 111 and the second electrode plate 112 may be disposed by changing their polarities.

The separator 113 may be positioned between the first electrode plate 111 and the second electrode plate 112 to prevent electrical short circuits and to allow movement of lithium ions. The separator 113 may be made, for example, of polyethylene, polypropylene, or a composite film of polypropylene and polyethylene. Meanwhile, the present invention does not limit the material of the separator 113 to those disclosed herein.

The electrode assembly 110 may be practically accommodated in the case 140 with an electrolytic solution. The electrolytic solution may include a lithium salt dissolved in an organic solvent. In addition, the electrolytic solution may be in a liquid, a solid or a gel phase.

Meanwhile, the first electrode tab 111b and the second electrode tab 112b may be connected to at least each one portion of the first electrode plate 111 and the second electrode plate 112, respectively. In more detail, the first electrode tab 111b is interposed between the electrode assembly 110 and the first terminal 120, and the second electrode tab 112b is interposed between the electrode assembly 110 and the second terminal 130. Throughout the specification of the present invention, the first electrode tab 111b and the second electrode tab 112b may be collectively referred to as electrode tabs 111b and 112b.

The first electrode tab 111b may be the first electrode uncoated portion of the first electrode plate 111 of the electrode assembly 110, where the first electrode active material is not coated, or may be a separate member connected to the first electrode uncoated portion. In addition, the second electrode tab 112b may be the second electrode uncoated portion of the second electrode plate 112 of the electrode assembly 110, where the second electrode active material is not coated, or may be a separate member connected to the second electrode uncoated portion.

The first electrode tab 111b is extended from a top end of the electrode assembly 110 to a bottom end of the first terminal 120, which will later be described, and the second electrode tab 112b is extended from the top end of the electrode assembly 110 to a bottom end of the second terminal 130, which will later be described. The first electrode tab 111b and the second electrode tab 112b are directly electrically connected or welded to the first terminal 120 and the second terminal 130, respectively.

In case of a high-capacity, high-output battery, the plurality of electrode tabs 111b and 112b are extended from the electrode assembly 110, thereby obtaining a high output current. In addition, since the electrode tabs 111b, 112b (i.e., uncoated portions or separate members) of the electrode assembly 110 are directly electrically connected to the terminals, electric paths can be shortened, thereby simplifying electrically connecting processes between the electrode assembly 110 and the terminals, lowering internal resistance of the secondary battery and reducing the number of components of the secondary battery. Additionally, since a winding axis of the electrode assembly 110 is substantially parallel with terminal axes of the first and second terminals 120 and 130, the electrode assembly 110 may have excellent capability of impregnating an electrolyte solution in injecting the electrolyte solution.

The first terminal 120 is electrically connected to the first electrode plate 111 and includes a first terminal pillar 121 and a first terminal plate 122.

The first terminal pillar 121 is upwardly protruded and extended a predetermined length while extending through a cap plate 151, which will later be described. The first terminal pillar 121 is electrically connected to the first electrode tab 111b from below the cap plate 151. In addition, the first terminal pillar 121 includes a flange 121a formed to prevent the first terminal pillar 121 from being dislodged from the cap plate 151 from below the cap plate 151. In particular, the first electrode tab 111b is electrically connected or welded to the flange 121a. Meanwhile, the first terminal pillar 121 is electrically insulated from the cap plate 151. Alternatively, when the first terminal 120 is a positive electrode terminal, the first terminal pillar 121 may be electrically connected to the cap plate 151.

The first terminal plate 122 includes a hole (not shown) formed at its center. The first terminal pillar 121 is coupled and welded to the hole. That is to say, boundary regions of the first terminal pillar 121 and the first terminal plate 122, which are upwardly exposed, are welded to each other. For example, laser beams are applied to the boundary regions of the first terminal pillar 121 and the first terminal plate 122 to allow the boundary regions to be fused to each other, followed by cooling, thereby achieving welding of the first terminal pillar 121 and the first terminal plate 122.

The second terminal 130 is electrically connected to the second electrode plate 112 and includes a second terminal pillar 131 and a second terminal plate 132.

The second terminal pillar 131 is upwardly protruded and extended a predetermined length while extending through the cap plate 151, which will later be described. The second terminal pillar 131 is electrically connected to the second electrode tab 112b from below the cap plate 151. In addition, the second terminal pillar 131 includes a flange 131a formed to prevent the second terminal pillar 131 from being dislodged from the cap plate 151 from below the cap plate 151. In particular, the second electrode tab 112b is electrically connected or welded to the flange 131a. Meanwhile, the second terminal pillar 131 is electrically insulated from the cap plate 151. Alternatively, the second terminal pillar 131 may be electrically connected to the cap plate 151.

The second terminal plate 132 includes a hole (not shown). The second terminal pillar 131 is coupled and welded to the hole. That is to say, boundary regions of the second terminal pillar 131 and the second terminal plate 132, which are upwardly exposed, are welded to each other. For example, laser beams are applied to the boundary regions of the second terminal pillar 131 and the second terminal plate 132 to allow the boundary regions to be fused to each other, followed by cooling, thereby achieving welding of the second terminal pillar 131 and the second terminal plate 132.

The case 140 is formed in a substantially hexahedral shape and may have an opening formed at its top portion to be opened. The case 140 includes a receiving part 140a in which the electrode assembly 110, the first terminal 120 and the second terminal 130 are inserted and placed. The case 140 includes two pairs of side wall parts spaced a predetermined distance apart from each other and facing each other and a bottom part formed at bottom portions of the two pairs of side wall parts to be substantially perpendicular thereto. The interior surface of the case 140 may be insulated, so that the case 140 is insulated from the electrode assembly 110, the first terminal 120, the second terminal 130 and the cap assembly 150. Here, the side wall parts include a pair of long side wall parts 141 and 142 having relatively large areas and a pair of short side wall parts 143 and 144 having relatively small areas. In addition, a safety vent 146 may be formed at one of the pair of short side wall parts 143 and 144, which will later be described in more detail.

The case 140 may be made of a conductive metal, such as aluminum, an aluminum alloy or nickel plated steel. Here, the interior surface of the case 140 may be insulated, so that the case 140 is insulated from the electrode assembly 110, the first terminal 120, the second terminal 130 and the cap assembly 150.

The cap assembly 150 is coupled to the case 140. That is to say, the cap assembly 150 closes the opening of the case 140. In detail, the cap assembly 150 includes the cap plate 151, an upper insulation member 152a, a lower insulation member 152b, a seal gasket 152c, and a plug 153.

The cap plate 151 may seal the opening of the case 140 and may be made of the same material as the case 140. For example, the cap plate 151 may be coupled to the case 140 by laser welding. Here, the cap plate 151 and the first terminal 120 may have the same polarity, as described above. Accordingly, the cap plate 151 and the case 140 may also have the same polarity.

The cap plate 151 includes an electrolyte injection hole 151a, through which an electrolytic solution is injected into the case 140. The electrolyte injection hole 151a is sealed by the plug 153.

The upper insulation member 152a is formed between each of the first terminal pillar 121 and the second terminal pillar 131 and the cap plate 151. In addition, the upper insulation member 152a makes close contact with the cap plate 151. In addition, the upper insulation member 152a makes close contact with the gasket 152c as well. The upper insulation member 152a electrically insulates each of the first terminal pillar 121 and the second terminal pillar 131 from the cap plate 151.

The lower insulation member 152b is formed between each of the first electrode tab 111b and the second electrode tab 112b and the cap plate 151 to prevent unnecessary electric shorts from occurring between each of the first electrode tab 111b and the second electrode tab 112b and the cap plate 151. That is to say, the lower insulation member 152b prevents electric shorts between the first electrode tab 111b and the cap plate 151 and between the second electrode tab 112b and the cap plate 151.

The seal gasket 152c is formed between each of the first terminal pillar 121 and the second terminal pillar 131 and the cap plate 151 using an insulating material and seals portions between each of the first terminal pillar 121 and the second terminal pillar 131 and the cap plate 151. The gasket 152c may prevent external moisture from penetrating into the secondary battery 100 or may prevent an electrolyte contained in the secondary battery 100 from flowing out.

Meanwhile, when the cap plate 151 and the first terminal 120 have the same polarity, the upper insulation member 152a, the lower insulation member 152b and the gasket 152c, which are disposed between the first terminal 120 and the cap plate 151, may not be provided.

Hereinafter, a case of the secondary battery according to an embodiment of the present invention will be described in more detail with reference to FIGS. 3A to 3D. FIGS. 3A to 3D specifically illustrate a case of the secondary battery according to an embodiment of the present invention.

Referring to FIGS. 3A to 3D, the case 140 includes an opened opening formed at its one plane, and a receiving part 140a for receiving the electrode assembly 110 is formed within the case 140. In addition, the case 140 includes a first long side wall part 141 and a second long side wall part 142 spaced apart from each other and facing each other, a first short side wall part 143 and a second short side wall part 144 spaced apart from each other and facing each other, and a bottom part 145 facing the opened opening. In addition, the safety vent 146 may be formed at the first short side wall part 143. However, the position of the safety vent 146 is not limited to that disclosed herein. Rather, the safety vent 146 may also be formed at the second short side wall part 144.

The safety vent 146 is formed at a lower portion of the first short side wall part 143. In particular, an end of the safety vent 146 may coincide with an end of the first short side wall part 143. The safety vent 146 includes a vent groove 147 and a notch groove 148. As the result of forming the vent groove 147 and the notch groove 148, the safety vent 146 may have a smaller thickness than other regions of the first short side wall part 143.

The vent groove 147 is formed to have a predetermined depth ranging from the exterior surface of the first short side wall part 143 to the interior surface corresponding to the receiving part 140a. In addition, the vent groove 147 includes a leading edge 147a and a trailing edge 147b. Here, the leading edge 147a may be a region where processing of the vent groove 147 is started, and the trailing edge 147b may be a region where processing of the vent groove 147 is terminated. In addition, the leading edge 147a may have a rounded shape, and the trailing edge 147b may have a linear shape. In particular, the trailing edge 147b may be positioned at an edge part C between the first side wall part 143 and the bottom part 145 of the case 140. Here, the edge part C may be positioned at a shorter one of edges of the first side wall part 143.

The notch groove 148 is formed to have a predetermined depth ranging from a bottom surface of the vent groove 147 to the interior surface. In the first side wall part 143, a region corresponding to the notch groove 148, that is, a notch portion, is practically ruptured by high-temperature, high-pressure gases generated when the secondary battery 100 abnormally operates due to, for example, over-charge or electrical short circuit. That is to say, since the notch portion corresponding to the notch groove 148 is formed to have a smaller thickness than other regions of the safety vent 146, it is ruptured when the internal pressure of the secondary battery 100 is increased, thereby releasing the internal gases to the outside.

A depth T2 of the vent groove 147 may be 40% to 60% of the overall thickness T1 of the first side wall part 143. In addition, a depth T3 of the notch groove 148 may be 40% to 60% of the depth T2 of the vent groove 147. Here, a sum (T2+T3) of the depth T2 of the vent groove 147 and the depth T3 of the notch groove 148 is preferably 70% to 90% of the overall thickness T1 of the first side wall part 143. That is to say, a thickness T4 of the notch portion of the safety vent 146, corresponding to the notch groove 148, is preferably 10% to 30% of the overall thickness T1 of the first side wall part 143. If the thickness T4 of the notch portion is less than 10%, the notch portion is easily ruptured even with a low internal pressure, which is not desirable. In addition, if the thickness T4 of the notch portion is greater than 30%, the notch portion may not be timely ruptured, which is not desirable, either.

Meanwhile, the vent groove 147 is formed through computer numerical control (CNC) processing using a high-speed cutting tool. That is to say, the vent groove 147 is formed by cutting a portion of the first short side wall part 143 using the cutting tool. The vent groove 147 may be formed by adding the high-speed cutting process to a transfer line of the case 140 in the course of manufacturing the secondary battery 100.

In detail, the case 140 is transferred through the transfer line. Here, the cutting tool approaches a predefined region of the first short side wall part 143 (i.e., a potential region of the leading edge) along a first axis (e.g., an axis perpendicular to the first short side wall part). Accordingly, the process of cutting the short side wall part 143 using the cutting tool is started to perform processing of the leading edge 147a. As the case 140 is moved through the transfer line, the cutting from the leading edge 147a to the edge part C is performed and is finally completed at the trailing edge 147b. Therefore, the leading edge 147a may be shaped to conform to the cutting tool, for example, in a rounded shape in conformity with the round cutting tool. In addition, since the cutting is performed to reach an end, i.e., the edge part C, of the first short side wall part 143, the trailing edge 147b and the edge part C may be positioned on the same line. Accordingly, the trailing edge 147b may be formed in a linear shape. Meanwhile, after the cutting performed up to the edge part C is completed, the cutting tool is separated away from the first short side wall part 143 along the first axis.

After forming the vent groove 147, the notch groove 148 is formed by punching the notch portion on the bottom surface of the vent groove 147. Alternatively, the forming of the notch groove 148 may be achieved by additionally performing a high-speed cutting process, like the vent groove 147.

As described above, since the secondary battery 100 according to the present invention includes the safety vent 146 having a smaller thickness than other regions of the case 140, the internal gases generated when the secondary battery 100 operates abnormally can be easily released, thereby improving the safety of the secondary battery 100.

Here, the safety vent 146 is positioned on the side wall part of the case 140, not on the cap plate on which a circuit module is to be installed. Therefore, the circuit module can be prevented from being damaged due to the releasing of high-temperature, high-pressure gases.

In addition, the safety vent 146 of the secondary battery 100 is integrally formed with the case 140. That is to say, the safety vent 146 having a smaller thickness than other regions of the case 140 is formed by forming the vent groove 147 and the notch groove 148 each having a predetermined depth are formed on the first side wall part 143 of the case 140. Therefore, the secondary battery 100 according to the present invention can demonstrate effects of reducing the manufacturing cost and simplifying the manufacturing process, compared to a case where a separate safety vent is installed.

In addition, since the cutting tool simply moves along the first axis during a processing operation of the safety vent 146, the processing operation can be more easily performed. In other words, the cutting tool approaches the first side wall part 143 along the first axis to process the leading edge 147a. Also, the cutting operation from the leading edge 147a to the edge part C can be achieved just by transferring the case 140 via the transfer line without additionally performing a separate operation. After the cutting operation is completed, the cutting tool is separated from the first side wall part 143 along the first axis. That is to say, when the cutting tool approaches the case 140 or recedes from the case 140, it moves along only the first axis, instead of moving along axes of different directions. Therefore, the processing of the safety vent 146 can be simply performed, thereby improving the processability and accuracy.

Additionally, the safety vent 146 is formed to be adjacent to the end of the first side wall part 143. In detail, since the safety vent 146 is extended from the leading edge 147a to the edge part C, the trailing edge 147b where the cutting operation is terminated is positioned on the same line with the edge part C. Therefore, the cutting tool can be made to approach the case 140 by accurately controlling only the position of the leading edge 147*a*, thereby improving processability and accuracy. In other words, since the safety vent 146 is formed by cutting the first side wall part 143 up to its end portion, it is not necessary to separately control the position of the trailing edge 147*b*, unlike in a case where the trailing edge is positioned on another particular region of the first side wall part 143. Therefore, the approaching or receding of the cutting tool can be more easily controlled, thereby improving the processability and accuracy.

Hereinafter, a case of a secondary battery according to another embodiment of the present invention will be described with reference to FIG. 4.

Figure 4:
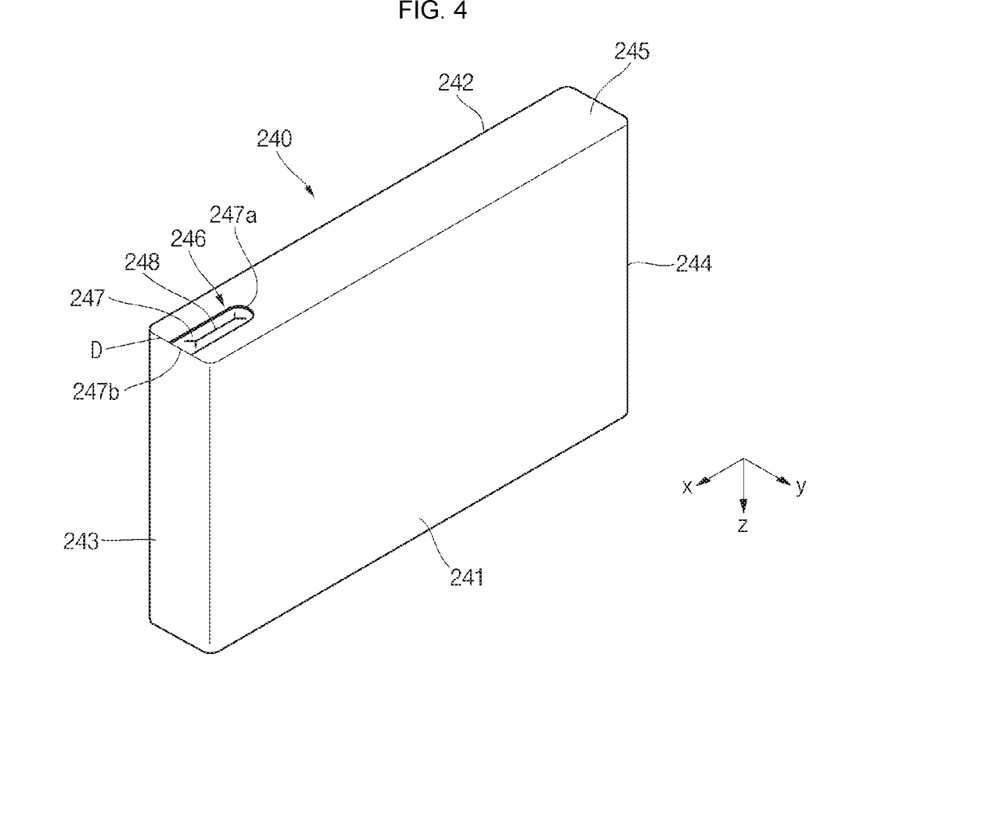
FIG. 4 is a perspective view of a case in a secondary battery according to another embodiment of the present invention.

FIG. 4 is a perspective view of a case of a secondary battery according to another embodiment of the present invention.

The secondary battery according to another embodiment of the present invention has substantially the same configuration with the secondary battery according to the previous embodiment, except for the position of a safety vent in the case. Therefore, repeated explanation will not be given in the following description.

Referring to FIG. 4, the case 240 includes a first long side wall part 241 and a second long side wall part 242 spaced apart from each other and facing each other, a first short side wall part 243 and a second short side wall part 244 spaced apart from each other and facing each other, and a bottom part 245 substantially perpendicular to the side wall parts 241, 242, 243 and 244. That is to say, the bottom part 245 facing upward is illustrated in FIG. 4, and an opened opening is formed at a region facing the bottom part 245, like in the previous embodiment.

A safety vent 246 is formed at one end of the bottom part 245. However, the position of the safety vent 246 is not limited to that disclosed herein. Rather, the safety vent 246 may be formed at the other end of the bottom part 245.

An end of the safety vent 246 may coincide with an end of the bottom part 245. The safety vent 246 includes a vent groove 247 and a notch groove 248. As the result of forming the vent groove 247 and the notch groove 248, the safety vent 246 may have a smaller thickness than other regions of the bottom part 245.

The vent groove 247 is formed to have a predetermined depth ranging from the exterior surface to the interior surface of the bottom part 245. Like in the previous embodiment, the vent groove 247 is formed by cutting a portion of the bottom part 245 using a cutting tool.

The vent groove 247 includes a leading edge 247*a* that is a region where cutting of the vent groove 247 is started, and a trailing edge 247*b* that is a region where the cutting of the vent groove 247 is terminated. Therefore, the leading edge 247*a* may have a rounded shape, and the trailing edge 247*b* may have a linear shape. In particular, the trailing edge 247*b* may be positioned on the same line with an edge part D of the case 240 between the bottom part 245 and the first side wall part 243.

The notch groove 248 is formed to have a predetermined depth ranging from a bottom surface of the vent groove 247 to the interior surface. That is to say, after forming the vent groove 247, the notch groove 248 is formed by punching a notch portion on the bottom surface of the vent groove 247. Alternatively, the notch groove 248 may also be formed by additionally performing a high-speed cutting process, like the vent groove 247.

Since a region corresponding to the notch groove 248 has a smaller thickness than other regions of the case 240, the notch groove 248 may be ruptured when the internal pressure of the secondary battery is increased, thereby releasing internal gases of the secondary battery to the outside.

As described above, in the secondary battery according to another embodiment of the present invention, the safety vent 246 is formed on the bottom part 245, unlike in the secondary battery 100 according to the previous embodiment. In particular, since the bottom part 245 is perpendicular to a winding axis of an electrode assembly 110, the internal gases generated in the electrode assembly 110 can be quickly moved to the safety vent 246. That is to say, the safety vent 246 can relatively quickly operate.

Hereinafter, practical application examples of a case in a secondary battery according to the present invention will be described.

Figure 5A:
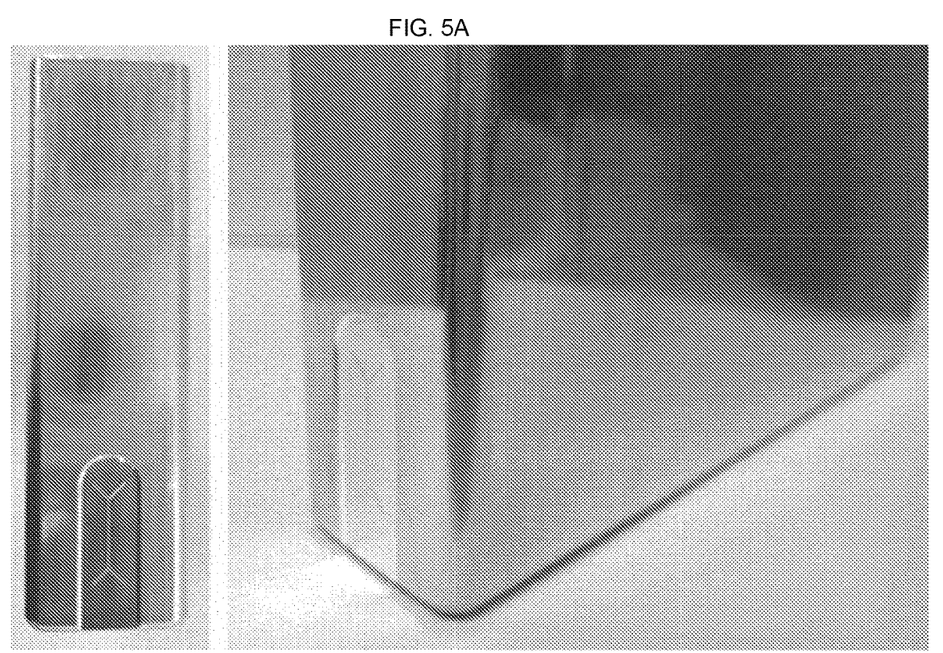
FIGS. 5A and 5B illustrate practical application examples of a case in a secondary battery according to the present invention.
Figure 5B:
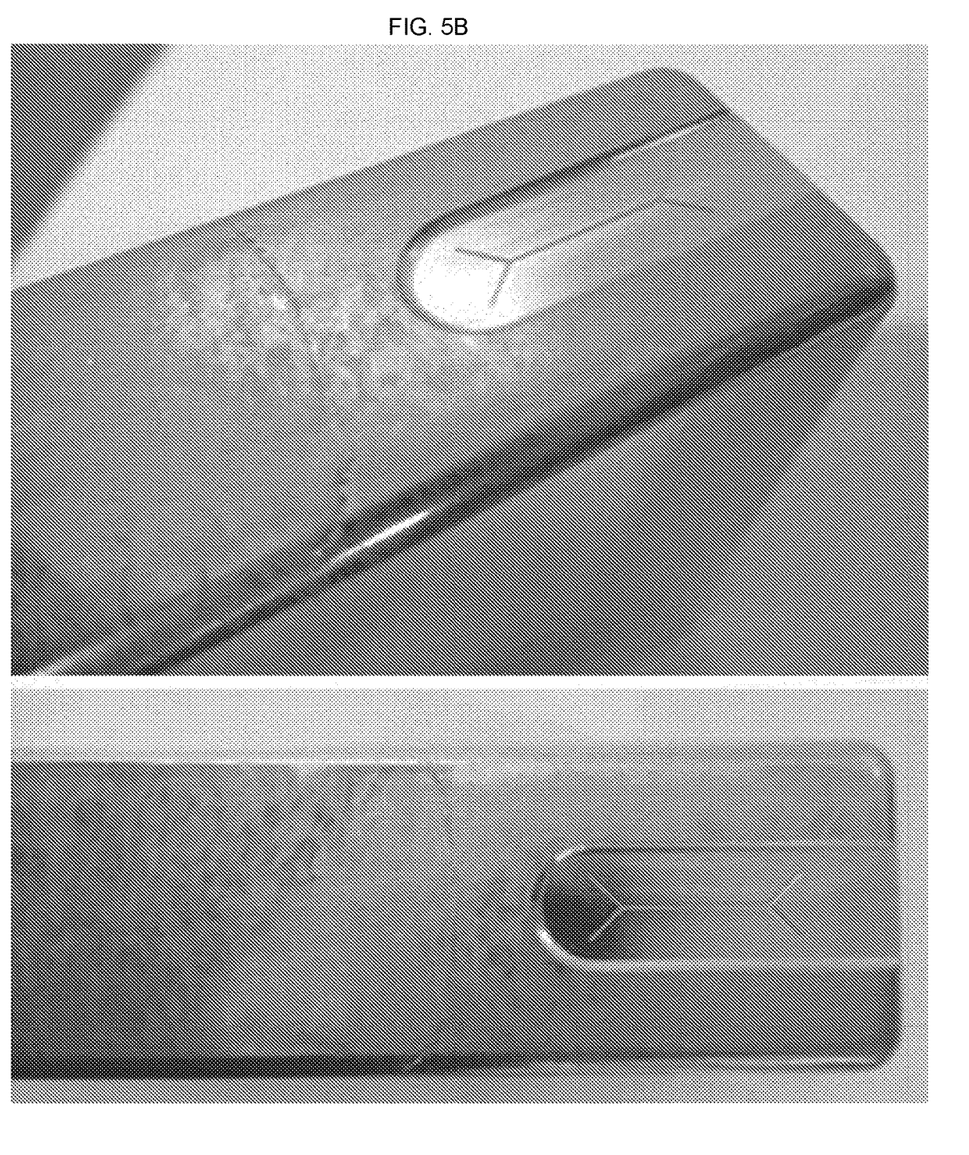

FIGS. 5A and 5B illustrate practical application examples of a case in a secondary battery according to the present invention.

Referring to FIG. 5A, a safety vent is formed on a bottom surface of a side wall part of the case in the secondary battery according to the present invention. Here, an end of the safety vent is extended to an end of the side wall part. In addition, a leading edge of the safety vent has a rounded shape and a trailing edge of the safety vent has a linear shape.

Referring to FIG. 5B, a safety vent is formed on a bottom part of the case in the secondary battery according to the present invention. Here, an end of the safety vent is extended up to an end of the bottom part of the case. In addition, a leading edge of the safety vent has a rounded shape and a trailing edge the safety vent has a linear shape.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
   an electrode assembly;
   a case for receiving the electrode assembly; and
   a cap plate covering an end of the case,
   wherein the case includes two pairs of side wall parts, the side wall parts in each pair facing each other, and a bottom part perpendicular to the side wall parts, and a safety vent is integrally formed with the case at an edge part of a region selected from the side wall parts and the bottom part,
   wherein the two pairs of side wall parts include first and second long side wall parts spaced apart from each other and facing each other; and first and second short side wall parts spaced apart from each other and having smaller areas than the first and second long side wall parts,
   wherein the safety vent extends to an exterior edge selected from a first edge where the first short side wall part and the bottom part meet, and a second edge where the second short side wall part and the bottom part meet,
   wherein the safety vent includes a vent groove having a depth from an exterior surface of the case and a notch groove extending from a bottom surface of the vent groove so as to have a depth from the bottom surface of the vent groove, the vent groove extending in a first direction from a leading edge to a trailing edge so that the trailing edge is colinear with the exterior edge selected from the first edge and the second edge,
wherein the leading edge is formed in a rounded shape, and the trailing edge is formed in a linear shape, and
wherein the notch groove has a V-shaped cross-section in a second direction perpendicular to the first direction.

2. The secondary battery of claim 1, wherein a sum of the depth of the vent groove and the depth of the notch groove is 70% to 90% of an overall thickness of the region where the safety vent is formed.

3. The secondary battery of claim 1, wherein the safety vent extends along either the first short side wall part to the first edge, or along the second short side wall part to the second edge.

4. The secondary battery of claim 1, wherein the safety vent extends along the bottom part of the case either to the first edge, or to the second edge.

5. The secondary battery of claim 1, wherein the notch groove is spaced apart from the exterior edge selected from the first edge and the second edge.

* * * * *